United States Patent
Lee et al.

(10) Patent No.: US 12,177,202 B2
(45) Date of Patent: Dec. 24, 2024

(54) METHOD OF PROVIDING LOGIN INFORMATION AND ELECTRONIC DEVICE PERFORMING THEREOF

(71) Applicant: SAMSUNG ELECTRONICS CO., LTD., Suwon-si (KR)

(72) Inventors: Seonhyung Lee, Suwon-si (KR); Joohyun Kim, Suwon-si (KR); Jaewon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 151 days.

(21) Appl. No.: 18/071,228

(22) Filed: Nov. 29, 2022

(65) Prior Publication Data

US 2023/0093667 A1 Mar. 23, 2023

Related U.S. Application Data

(63) Continuation of application No. PCT/KR2022/010613, filed on Jul. 20, 2022.

(30) Foreign Application Priority Data

Sep. 7, 2021 (KR) .................. 10-2021-0119241
Oct. 1, 2021 (KR) .................. 10-2021-0131059

(51) Int. Cl.
*H04L 9/40* (2022.01)
*H04L 9/08* (2006.01)

(52) U.S. Cl.
CPC ........ *H04L 63/0815* (2013.01); *H04L 9/0825* (2013.01); *H04L 9/0869* (2013.01)

(58) Field of Classification Search
USPC .......................................................... 726/8
See application file for complete search history.

(56) References Cited

U.S. PATENT DOCUMENTS 8,151,333 B2 * 4/2012 Zhu ................ H04L 63/083
726/8
8,607,041 B2 * 12/2013 Reno ................ G06F 21/602
713/153

(Continued)

FOREIGN PATENT DOCUMENTS

JP 2013-242808 A 12/2013
KR 10-2009-0102924 A 10/2009

(Continued)

OTHER PUBLICATIONS

Int. Search Report (PCT/ISA/210) dated Oct. 18, 2022 issued by the Int. Searching Authority in App No. PCT/KR2022/010613.

(Continued)

*Primary Examiner* — Kambiz Zand
*Assistant Examiner* — Mahabub S Ahmed
(74) *Attorney, Agent, or Firm* — Sughrue Mion, PLLC

(57) ABSTRACT

A method of providing login information may include sending, from a service web page executed on a browser, a login request to an authentication web page executed on the browser, executing, by the authentication web page, a single sign on (SSO) agent in an electronic device, sending, by the authentication web page, a request for authentication information of a user to the SSO agent, generating and transmitting, by the SSO agent, a random number to the authentication web page, generating and transmitting an encrypted eigenvalue on an authentication web server based on the random number to the SSO agent, calling, by the SSO agent, an authentication application programming interface (API) server, and transmitting the eigenvalue, validating the eigenvalue on the authentication API server, and receiving, by the SSO agent, a result of the validating from the authentication API server, and transmitting the authentication information to the authentication web server.

20 Claims, 5 Drawing Sheets

(56) References Cited

U.S. PATENT DOCUMENTS

| | | | |
|---|---|---|---|
| 8,819,444 B2* | 8/2014 | Shahbazi | H04L 9/0863 |
| | | | 713/183 |
| 9,654,462 B2* | 5/2017 | Burch | H04W 12/069 |
| 10,805,283 B2 | 10/2020 | Kludy | |
| 10,911,431 B2* | 2/2021 | Leavy | H04L 9/085 |
| 11,929,997 B2* | 3/2024 | Briceno | H04W 12/06 |
| 2003/0012382 A1* | 1/2003 | Ferchichi | H04L 63/0815 |
| | | | 380/270 |
| 2008/0178002 A1 | 7/2008 | Hirata et al. | |
| 2012/0054625 A1* | 3/2012 | Pugh | G06F 21/105 |
| | | | 715/736 |
| 2014/0075202 A1* | 3/2014 | Varadharajan | G06F 21/41 |
| | | | 713/183 |
| 2016/0080331 A1* | 3/2016 | Henry | G06Q 20/085 |
| | | | 713/168 |
| 2016/0294810 A1 | 10/2016 | Wang et al. | |
| 2018/0314817 A1 | 11/2018 | Gadde et al. | |
| 2019/0356650 A1* | 11/2019 | Leavy | H04L 63/06 |
| 2020/0280559 A1* | 9/2020 | Wu | H04L 63/0815 |

FOREIGN PATENT DOCUMENTS

| | | |
|---|---|---|
| KR | 10-1302763 B1 | 9/2013 |
| KR | 10-1572598 B1 | 12/2015 |
| KR | 10-1883210 B1 | 7/2018 |
| WO | 2013/165274 A2 | 11/2013 |

OTHER PUBLICATIONS

Extended European Search Report dated Aug. 23, 2024, issued by the European Patent Office in European Application No. 22867547.6.

* cited by examiner

METHOD OF PROVIDING LOGIN INFORMATION AND ELECTRONIC DEVICE PERFORMING THEREOF

CROSS-REFERENCE TO RELATED APPLICATION

This application is a bypass continuation of PCT International Application No. PCT/KR2022/010613, which was filed on Jul. 20, 2022, and claims priority to Korean Patent Application No. 10-2021-0119241, filed on Sep. 7, 2021, and Application No. 10-2021-0131059, filed on Oct. 1, 2021 in the Korean Intellectual Property Office, the disclosures of which are incorporated by reference herein in their entireties.

BACKGROUND

1. Field

Various example embodiments described herein relate to a method of providing login information, and an electronic device performing the method.

2. Description of the Related Art

Regarding the use of one service account, account information is not shared between a device and a browser in a way of transmitting account information stored in the device to the browser or transmitting account information input via the browser to the device, because having a device and a browser communicate with each other in these ways is difficult.

When a user who has already logged in to a device with an account is trying to log in with the same account information through a browser, they need to enter the same account information, such as an identification (ID) or password, again through the browser, because it is currently not possible for a device and a browser to share account information with each other directly.

SUMMARY

One or more example embodiments may address at least the problems and/or disadvantages described above, and other disadvantages not described above. Also, the example embodiments are not required to overcome and may not overcome any of the problems and disadvantages described above.

When a user logs in to a device and a browser respectively, the user may experience inconvenience because the user may be asked to repeat the same process. When the user forgets an ID or password of an account the device is logged in to, the user may also experience inconvenience. These inconveniences may encourage the user to stop using a service.

Whenever account information stored in a device is transmitted to a browser, a local host for transmitting account information from a device to a browser runs. The local host may become an attack point of a static network, and thus may be a security vulnerability and can increase battery consumption of the device. If a one time token (OTP) is used to log in via a malicious browser or web page that may be forged or manipulated and is extorted on a network, account information may be exposed.

According to various example embodiments described herein, a method of providing login information involving transmitting login information of a user logged in to an electronic device may be provided and an electronic device performing the method may be provided.

According to various example embodiments described herein, a method of providing login information which may involve performing hypertext transfer protocol (HTTP) communication, generating a random number value in an electronic device, and validating a browser, an authentication web server, a random number value, a user authentication token, and a timestamp may be provided, and an electronic device performing the method may be provided. Accordingly, login information transmitted by the method may be more secure and less likely to be extorted by an external network.

According to an aspect of the disclosure, a method of providing login information may include sending, from a service web page executed on a browser, a login request to an authentication web page executed on the browser. The method may include executing, by the authentication web page, a single sign on (SSO) agent in an electronic device. The method may include sending, by the authentication web page, a request for authentication information of a user to the SSO agent. The method may include sending, by the authentication web page, a request for a random number to the SSO agent. The method may include generating, by the SSO agent, a random number and transmitting the random number to the authentication web page. The method may include generating an encrypted eigenvalue on an authentication web server based on the random number and transmitting the eigenvalue to the SSO agent. The method may include calling, by the SSO agent, an authentication application programming interface (API) server, and transmitting the eigenvalue. The method may include validating the eigenvalue on the authentication API server, and receiving, by the SSO agent, a result of the validating from the authentication API server. The method may include transmitting the authentication information to the authentication web server.

According to an aspect of the disclosure, an electronic device may include at least one processor, and a memory configured to store instructions executed by the at least one processor, a browser, and an SSO agent. The browser may be configured to access a service web server and an authentication web server to execute a service web page and an authentication web page. The SSO agent may be configured to log in to the electronic device and/or the service web server. The at least one processor may be configured to, in response to the instructions being executed by the at least one processor, send, from the service web page executed on the browser, a login request to the authentication web page executed on the browser. The at least one processor may be configured to cause the authentication web page to execute the SSO agent, and to send a request for authentication information of a user to the SSO agent. The at least one processor may be configured to cause the SSO agent to generate a random number and transmit the random number to the authentication web page. The at least one processor may be configured to call an authentication API server to transmit an eigenvalue received from an authentication web server, and to receive a validation result of the eigenvalue from the authentication API server. The at least one processor may be configured to transmit the authentication information to the authentication web server.

According to an aspect of the disclosure, a non-transitory computer readable medium may store computer readable program code or instructions for carrying out operations, when executed by a processor, for providing login information.

The operations may include accessing a service web server and an authentication web server, by an electronic device via a browser stored on the electronic device, to execute a service web page from the service web server and an authentication web page from the authentication web server. The operations may include accessing the executed service web page, by the electronic device via the browser, to cause the service web server to send a login request to the authentication web server. The operations may include receiving one or more instructions from the authentication web server, by the electronic device, in response to causing the service web server to send the login request to the authentication web server, to execute a single sign on (SSO) agent of the electronic device. The operations may include receiving a request for authentication information from the authentication web server, by the electronic device via the SSO agent. The operations may include generating a random number, by the electronic device via the SSO agent, in response to receiving the request for authentication information. The operations may include sending the random number to the authentication web server, by the electronic device via the SSO agent. The operations may include receiving an eigenvalue generated on the authentication web server, by the electronic device via the SSO agent, wherein the eigenvalue is generated based at least in part on the random number. The operations may include sending a request to authenticate the eigenvalue, by the electronic device via the SSO agent, to an authentication application programming interface (API) server. The operations may include receiving an authentication result corresponding to the eigenvalue, by the electronic device via the SSO agent, from the authentication API server in response to sending the request to authenticate the eigenvalue. The operations may include sending authentication information to the authentication web server, by the electronic device via the SSO agent, based at least in part on the authentication result, the authentication information corresponding to the login request sent by the service web server, and wherein the authentication information is used by the authentication web server to respond to the login request from the service web server.

The operations may further include executing a local host web server, by the electronic device via the SSO agent, in response to the authentication web server executing the SSO agent, and verifying the browser and the authentication web page, by the electronic device via the SSO agent, in response to receiving the request for authentication information from the authentication web server.

The operations may further include outputting a notification, by the electronic device via the SSO agent, in response to sending the authentication information to the authentication web server, the notification indicating that a logging in of a user to a service provided by the service web server is complete.

The operations may further include terminating the local host web server, by the electronic device via the SSO agent, and terminating the SSO agent, by the electronic device via the SSO agent.

According to various example embodiments described herein, it may be possible to transmit authentication information of a user logged in an electronic device, and to log in to a web server where a user may receive service.

According to various example embodiments described herein, HTTP communication performed in an electronic device may decrease a risk of extortion by an external network, and it may be possible to enhance security of user account information by transmitting a generated random number value only to an authentication web server and validating a browser and the authentication web server.

According to various example embodiments described herein, it may be possible to validate a random number value and a timestamp of an eigenvalue decrypted by an authentication API server to prevent a duplicate login request with the same random number value and to determine whether the timestamp falls within a valid period range.

BRIEF DESCRIPTION OF THE DRAWINGS

The above and/or other aspects will be more apparent from descriptions of certain example embodiments referring to the accompanying drawings, in which.

DETAILED DESCRIPTION

Figure 1:
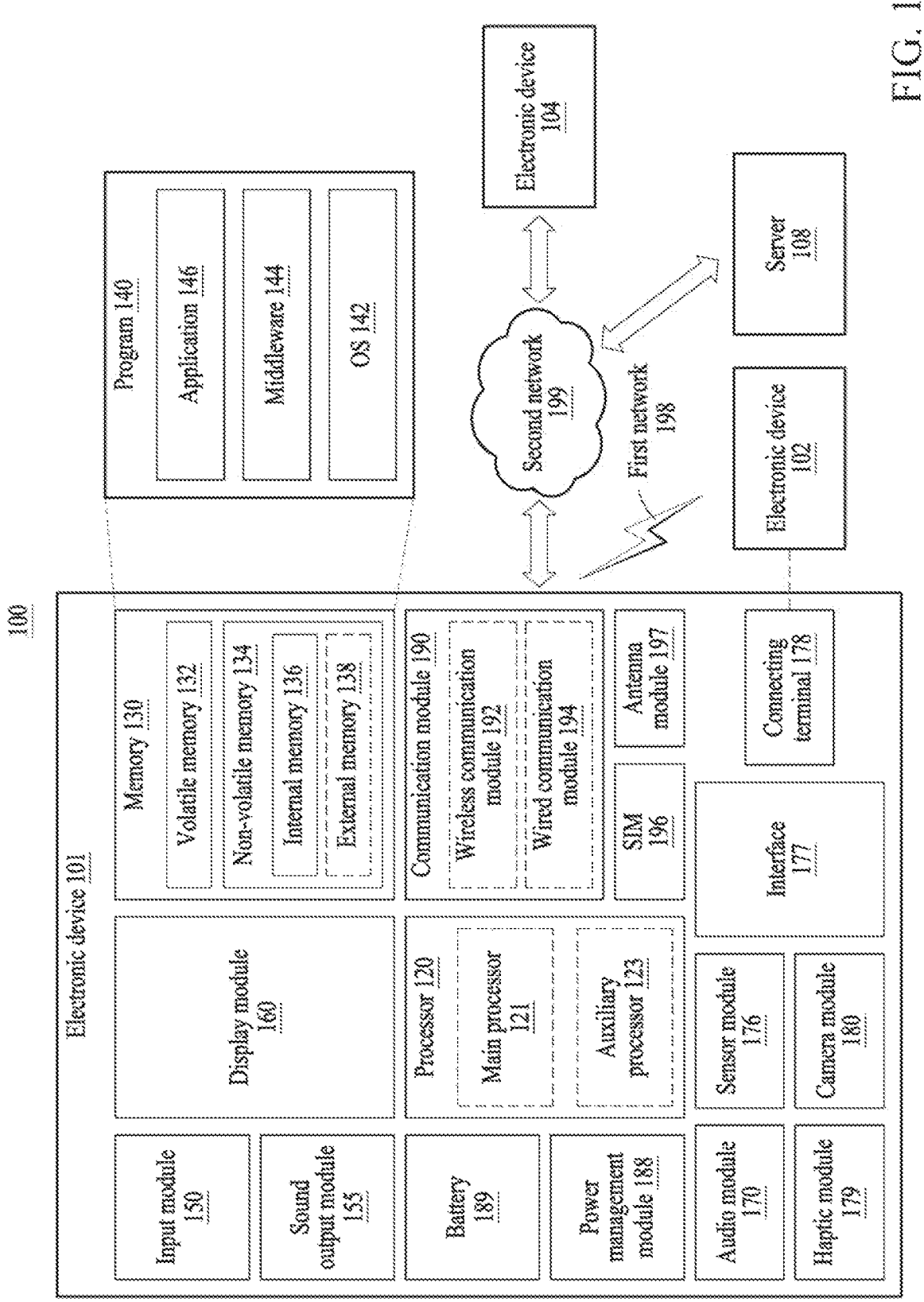
FIG. 1 is a block diagram illustrating an electronic device in a network environment according to various example embodiments.

Hereinafter, example embodiments will be described in detail with reference to the accompanying drawings. When describing the example embodiments with reference to the accompanying drawings, like reference numerals refer to like elements and any repeated description related thereto will be omitted.

FIG. 1 is a block diagram illustrating an electronic device 101 in a network environment 100 according to various example embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one of the components (e.g., the connecting terminal 178) may be omitted from the electronic device 101, or one or more other components may be added to the electronic device 101. In some example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a part of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but examples of which are not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from outside of the electronic device 101 (e.g., from a user). The input module 150 may include, for example, a microphone, a mouse, a keyboard, a key (e.g., a button), or a digital pen (e.g., a stylus pen).

The sound output module 155 may output a sound signal outside of the electronic device 101. The sound output module 155 may include, for example, a speaker or a receiver. The speaker may be used for general purposes, such as playing multimedia or playing recordings. The receiver may be used to receive an incoming call. According to an example embodiment, the receiver may be implemented separately from the speaker or as a part of the speaker.

The display module 160 may visually provide information to the outside of the electronic device 101 (e.g., to a user). The display module 160 may include, for example, a display, a hologram device, or a projector, and control circuitry to control a corresponding one of the display, the hologram device, and the projector. According to an example embodiment, the display module 160 may include a touch sensor adapted to detect a touch, or a pressure sensor adapted to measure the intensity of force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or headphones) directly or wirelessly connected to the electronic device 101.

The sensor module 176 may detect an operational state (e.g., power or temperature) of the electronic device 101 or an environmental state external to the electronic device 101 (e.g., a state of a user), and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, a part of a power management integrated circuit (PMIC).

The battery 189 may supply power to at least one component of the electronic device 101. For example, if the electronic device 101 is not connected to an external power source that can supply power to the at least one component, then the battery 189 may supply power to the at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit a signal or power to outside of the electronic device 101 (e.g., to the external electronic device 102), or receive a signal or power from outside of the electronic device 101 (e.g., from the external electronic device 102). According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may include a mmWave antenna module. The mmWave antenna module may include, for example, a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be mutually coupled and communicate signals (e.g., commands or data) there between via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figures 2A, 2B, 2C:
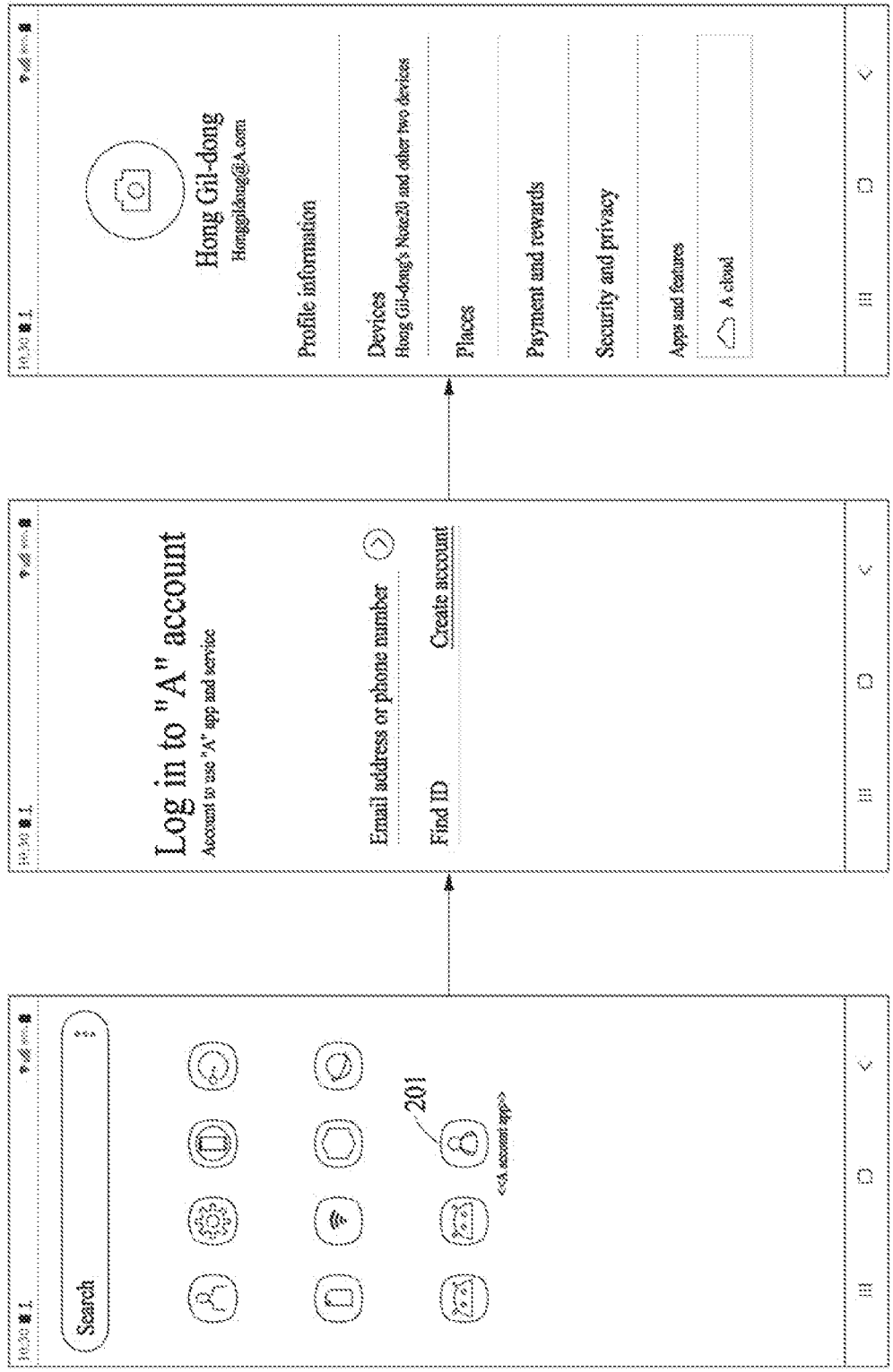
FIGS. 2A-2C are diagrams illustrating a method of logging in to an electronic device according to various example embodiments.

FIGS. 2A-2C are diagrams illustrating a method of logging in to an electronic device according to various example embodiments. The logging in can include, for example, an operation in which a user logs in to an electronic device (e.g., the electronic device 101).

Referring to FIGS. 2A-2C, the electronic device may log in to an account application using input account information. In some implementations, the account application may be referred to as a single sign on (SSO) agent. As illustrated in FIG. 2A, an identifier, such as an icon 201, for executing an "A" account application corresponding to the account application of the electronic device may be displayed on a display module. The electronic device may execute the "A" account application by receiving, from a user, an input to execute the "A" account application (e.g., an input selecting the icon 201).

As illustrated in FIG. 2B, in response to the account application of the electronic device being executed by the user, the electronic device may provide a screen for inputting account information of the user, such as an identification (ID) and a password. In some implementations, the electronic device may receive account information from the user, and the SSO agent may log in with an account of the user using the received account information.

As illustrated in FIG. 2C, information on a logged-in account of a user may be displayed on the display module of the electronic device.

Figure 3A:
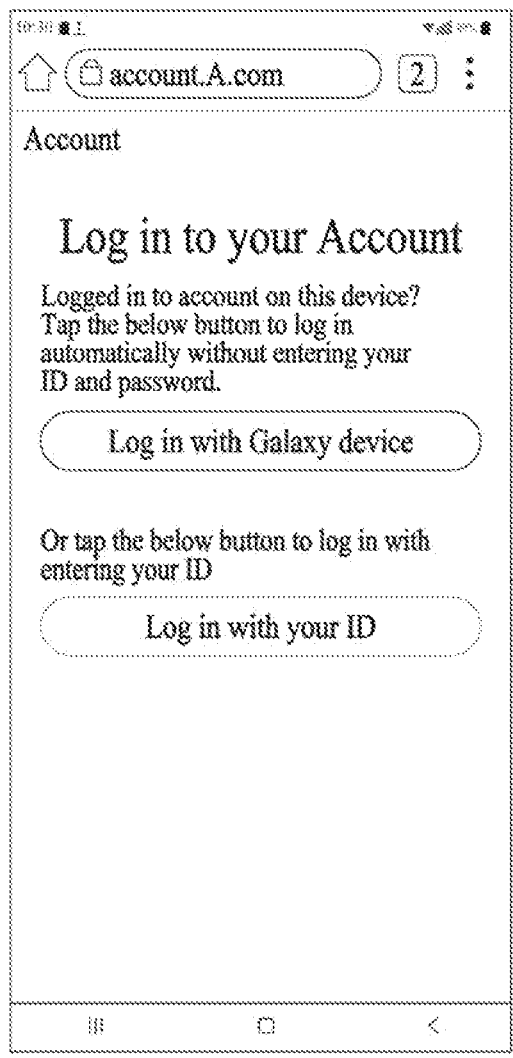
FIGS. 3A-3B are diagrams illustrating a method of transmitting account information to a browser according to various example embodiments.
Figure 3B:
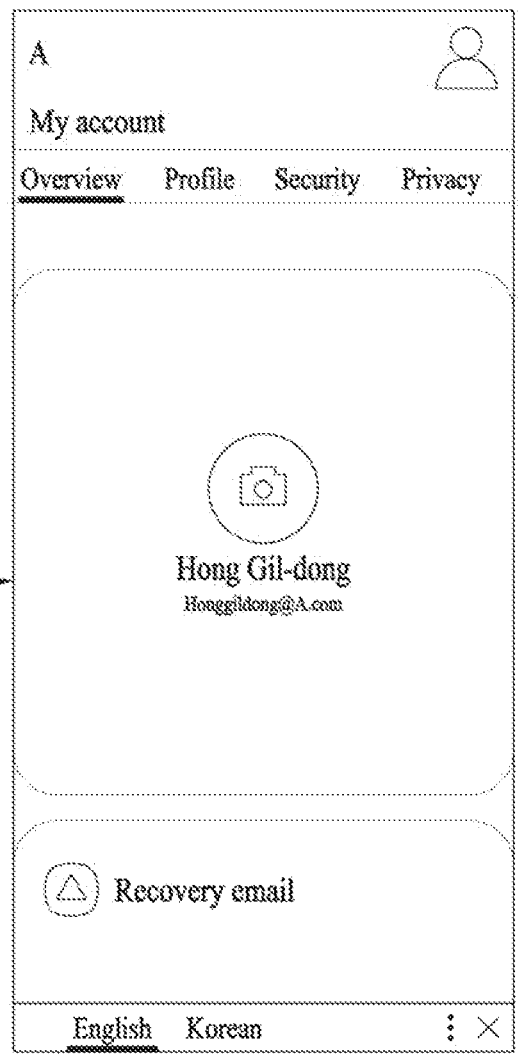

FIGS. 3A-3B are diagrams illustrating a method of transmitting account information to a browser according to various example embodiments. The transmitting of the account information can include, for example, an operation in which an electronic device (e.g., the electronic device 101) transmits the account information to the browser.

Referring to FIGS. 3A-3B, the electronic device may transmit account information of a user account logged in to the electronic device to the browser. In some implementations, the account information of the user account logged in to the electronic device may be account information of a user logged in to an SSO agent.

FIG. 3A illustrates a service web page (e.g., a login page) executed on the browser of the electronic device and displayed on a display module by the electronic device to receive a login request from a user. In some implementations, the service web page may be executed on a browser using data, such as a code and instructions received from a service web server that a user accesses to use a service. In some implementations, the service web page may be a web page received from the service web server.

As illustrated in FIG. 3B, in response to receiving an input to log in to the service web server using authentication information of a logged-in user, the electronic device may log in to the service web server. For example, in response to a user selecting "Log in with Galaxy device" shown in FIG. 3A, the electronic device may automatically log in to the service web server using authentication information of the user logged in to an SSO agent.

As another example, in response to the user selecting "Log in with your ID" shown in FIG. 3A, the electronic device may display a user interface screen for inputting information to log in to an account of the user, such as an ID and a password of the user. The information used to log in to the account of the user may include biometric authentication information, such as fingerprint recognition and iris recognition information.

In some implementations, in response to a login request being received from the user via the service web page of FIG. 3A, the authentication web page may be executed on the browser. In some implementations, the authentication web page may be executed on the browser using data, such as a code and instructions received from the authentication web server.

In some implementations, the electronic device may display a login screen (substantially the same as the service web page illustrated in FIG. 3A) using an authentication web page received from an authentication web server and executed on a browser.

In some implementations, the electronic device may automatically log in to the service web server without additionally inputting an ID and a password using authentication information of the user logged in to the electronic device.

Figure 4:
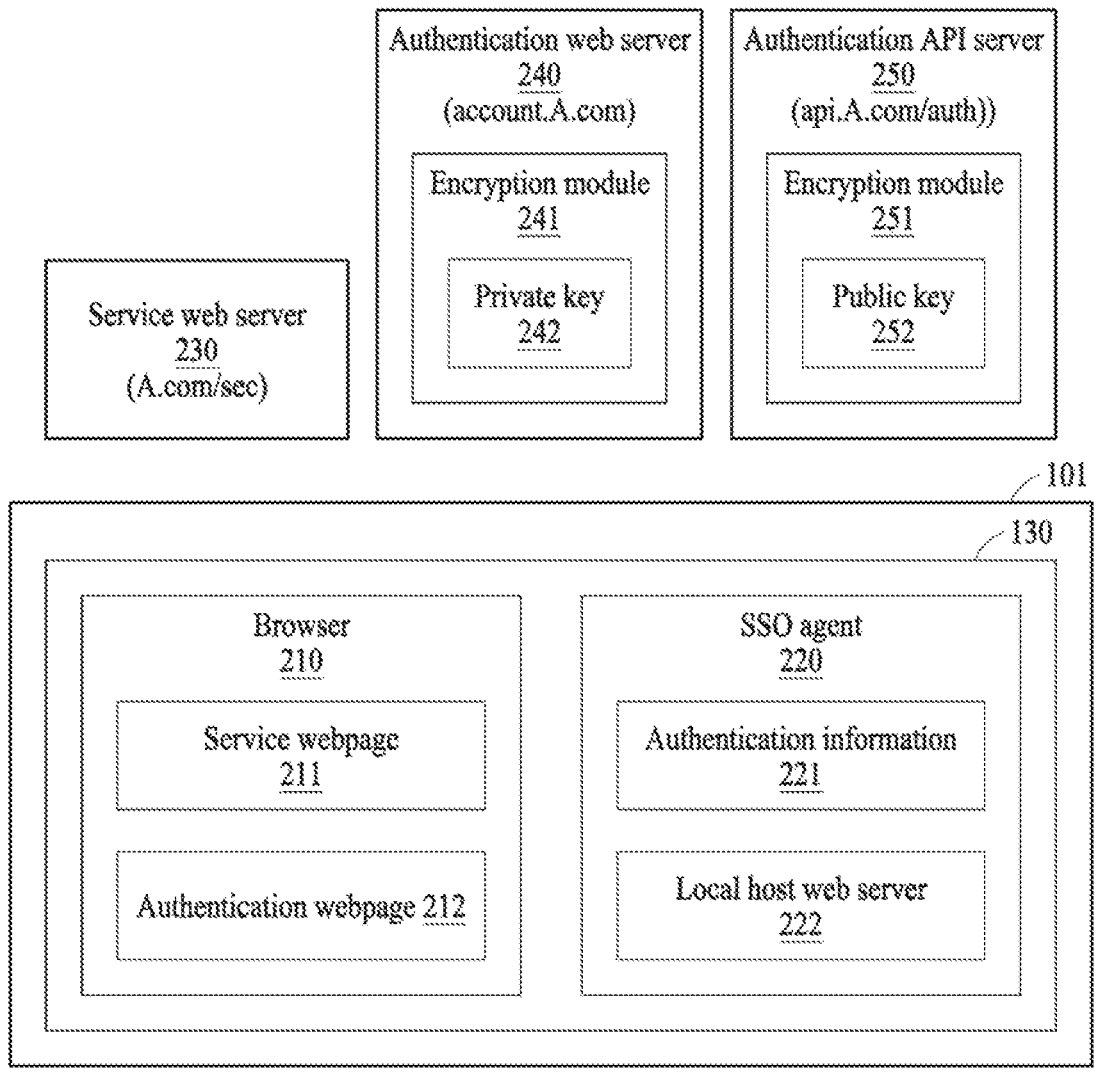
FIG. 4 is a schematic block diagram illustrating a network environment of an electronic device according to various example embodiments.

FIG. 4 is a schematic block diagram illustrating a network environment of an electronic device according to various example embodiments. As illustrated in FIG. 4, the network environment may include the electronic device 101, a service web server 230, an authentication web server 240, and an authentication API server 250.

The electronic device 101 may be connected and in communication with the service web server 230, the authentication web server 240, and the authentication API server 250 through, for example, the second network 199. In some implementations, the electronic device 101 may transmit authentication information 221 of a user stored in the SSO agent 220 of the electronic device 101 to a browser 210 by communicating with the user service web server 230, the authentication web server 240, and the authentication API server 250.

Referring to FIG. 4, the memory 130 of the electronic device 101 may include the browser 210 and the SSO agent 220. For example, the browser 210 and the SSO agent 220 may be stored in the memory 130. A processor (e.g., the processor 120) of the electronic device 101 may execute the browser 210 and the SSO agent 220 stored in the memory 130.

In some implementations, the browser 210 may execute a service web page 211 and an authentication web page 212. The service web page 211 and the authentication web page 212 may be results of executing, on the browser 210, messages received from the service web server 230 and the authentication web server 240 respectively. For example, the browser 210 may receive a web page from the service web server 230 and/or the authentication web server 240, and in response to the received web page being executed, the service web page 211 and/or the authentication web page 212 may be executed on the browser 210.

In some implementations, the service web page 211 may be a web page to send a request for authentication executed on the browser 210 using the message received from the service web server 230. The service web page 211 may be executed on the browser 210 using data, such as a code and instructions received from the user service web server 230. In some implementations, the authentication web page 212 may be a web page to send a request for authentication executed on the browser 210 using the message received from the authentication web server 240. The authentication web page 212 may be executed on the browser 210 using data, such as a code and instructions received from the authentication web server 240.

In some implementations, the SSO agent 220 may be an account application. In some implementations, the SSO agent 220 may generate and execute a local host web server 222 by receiving a request from the authentication web server 240. In some implementations, the SSO agent 220 may store login authentication information 221 of a user input to the electronic device 101. In some implementations, the login authentication information 221 of the user may be a user authentication token issued in response to a login being performed with user account information.

In some implementations, the local host web server 222 may correspond to a communication channel for communication with the authentication web server 240 and/or the authentication API server 250. In some implementations, in response to being executed by the SSO agent 220, the local host web server 222 may perform communication with the authentication web server 240.

In some implementations, in response to authentication being completed, the SSO agent 220 may transmit account information of a user stored in the SSO agent 220 of the electronic device 101 to the browser 210 and then terminate the local host web server 222. In some implementations, the SSO agent 220 may terminate the local host web server 222 and then terminate itself. By terminating the local host web server 222, it may be possible to prevent malicious attacks on the electronic device 101 and reduce battery consumption of the electronic device 101.

According to various example embodiments, the service web server 230 may be a web server that users access to use a service. In response to logging in to the service web server 230 with an account of a user, the electronic device 101 may receive a service from the service web server 230.

The authentication web server 240 may receive a login request from the service web server 230. For example, the authentication web server 240 may provide data to log in to the electronic device 101 by receiving the login request. In some implementations, the authentication web server 240 may perform an authentication process.

According to various example embodiments, the authentication web server 240 may generate an asymmetric key (e.g., a public key and a private key) in an encryption module 241. In some implementations, the authentication web server 240 may transmit a public key 252 to the authentication API server 250. In some implementations, the asymmetric key may be generated according to a Rivest-Shamir-Adleman (RSA) algorithm.

According to the RSA algorithm, a value encrypted with the private key 242 of the authentication web server 240 being decryptable by the public key 252 on the authentication API server 250 is a guarantee that the encrypted value was encrypted with the private key 242 of the authentication web server 240.

The authentication API server 250 may receive the public key 252 generated in the encryption module 241 of the authentication web server 240 from the authentication web server 240. The received public key 252 may be stored in the encryption module 251 of the authentication API server 250. In some implementations, the authentication API server 250 may determine whether a request received from the SSO agent 220 is valid using the received public key 252. For example, the authentication API sever 250 may verify that the request is valid using the public key 252 received from the authentication web server 240. Meanwhile, an eigenvalue is received from the electronic device 101, if the eigenvalue is decryptable.

In some implementations, in response to it being determined that the request received from the SSO agent 220 is not valid, the authentication API server 250 may transmit a rejection message that the authentication request is rejected to the SSO agent 220. In some implementations, the authentication API server 250 may only respond when the electronic device 101 has the user authentication information 221 or the user login authentication information 221, and the authentication API server 250 may not respond when the request is not authenticated.

Figure 5:
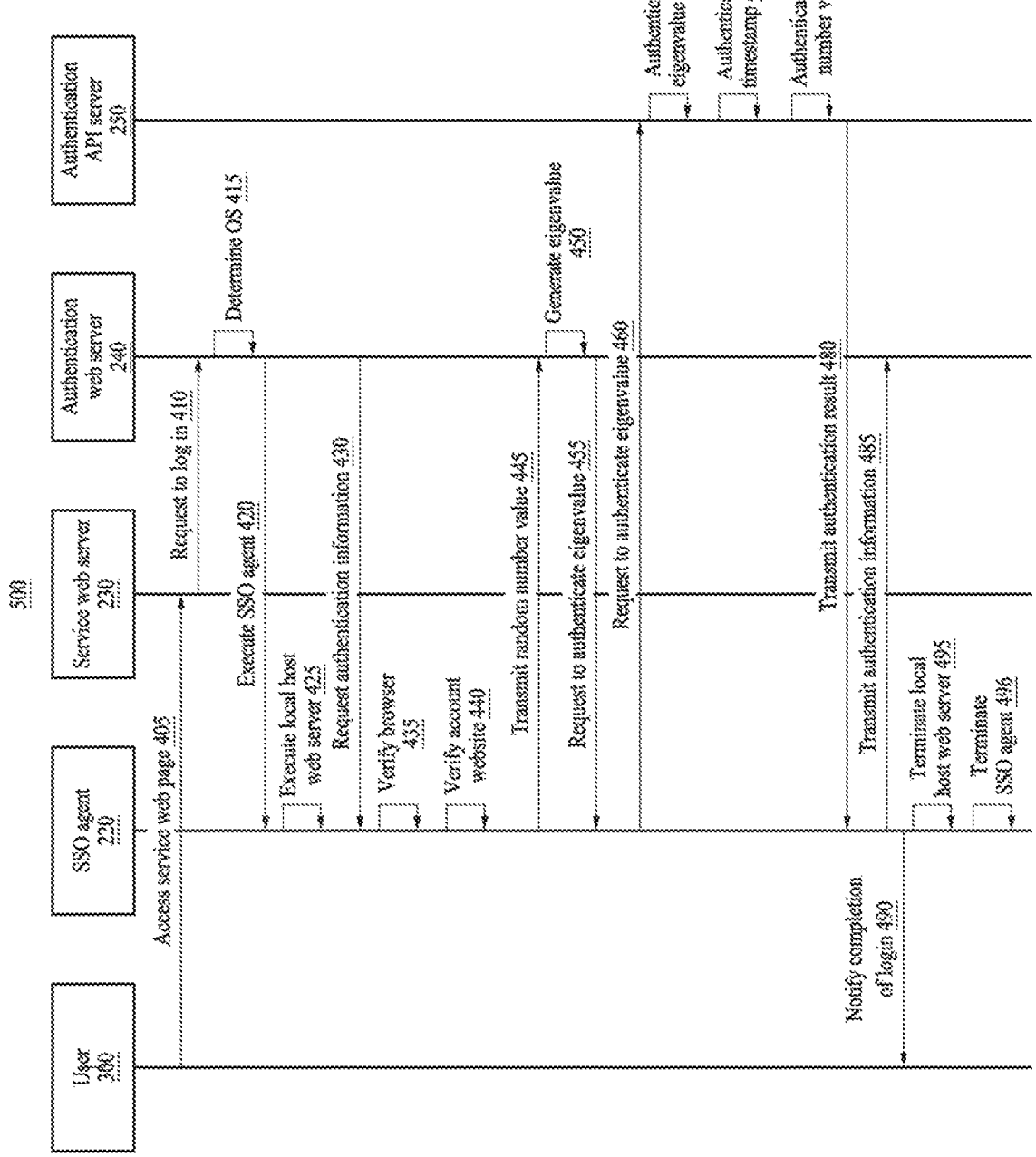
FIG. 5 is a diagram illustrating a method of transmitting authentication information to a browser according to various example embodiments.

FIG. 5 illustrates a method 500 of transmitting authentication information to a browser according to various example embodiments. For example, an electronic device (e.g., the electronic device 101) may transmit authentication information (e.g., the authentication information 221) to a browser (e.g., the browser 210).

Referring to FIG. 5, before operation 405 of the method 500, a login to the electronic device with an account of a user 300 is completed, for example, when a login to the SSO agent 220 with an account of a user is completed. As another example, the electronic device may log in to the SSO agent 220 with the account of the user by receiving account information of the user when the SSO agent 220 is executed according to a request by the authentication web server 240 or before a local host web server (e.g., the local host web server 222) calls the authentication API server 250.

In operation 405 of the method 500, the electronic device may access the service web server 230 via a browser according to an input of a user (e.g., user 300). Accessing the service web server 230 via the browser may include, for example, executing a service web page (e.g., the service web page 211) on the browser in response to a message received from the service web server 230.

In operation 410 of the method 500, in response to a user login request being received by the service web server 230, an authentication web page (e.g., the authentication web page 212) may be executed, and the login request may be transmitted to the authentication web server 240. The electronic device may communicate with the authentication web server (e.g., the authentication web server 240) in order to execute the authentication web page.

The login request received in operation 410 may be, for example, a request to log in using authentication information stored in the electronic device, or a request to log in by inputting an ID and a password. In response to the request to log in using the authentication information stored in the electronic device being received in operation 410, a method of logging in using the authentication information stored in the electronic device may be performed (described further below). In response to the request to log in by inputting an ID and a password being received in operation 410, the authentication web page 212 may be executed, and login may be performed by inputting an ID and a password on the authentication web page 212.

In operation 415 of the method 500, the authentication web server 240 may determine whether an operating system (OS) supports the method of providing login information.

In operation 420 of the method 500, in response to an input to log in to a user service web server with information of an account the electronic device is logged in to being received on the authentication web server 240, the authentication web server 240 may execute the SSO agent 220 of the electronic device.

In some implementations, the authentication web server 240 may generate a port number and transmit the port number to the SSO agent 220. The authentication web server 240 may generate the port number as a random value within a set range. The random value for the port (random port) may be, for example, an integer between 0 and 65536. The SSO agent 220 may generate the local host web server 222 to use the random port. By generating and transmitting the random value to be used by the local host web server 222, it may be possible to prevent a static port from being exposed, thereby reducing a chance of malicious attacks and enhancing security of user account information.

In operation 425 of the method 500, in response to the authentication web server 240 executing the SSO agent 220, the SSO agent 220 may generate the local host web server 222. In some implementations, if the SSO agent 220 receives a port number from the authentication web server 240, the SSO agent 220 may generate the local host web server 222 according to the received port (e.g., according to a random port).

In operation 430 of the method 500, the authentication web server 240 may transmit a request for authentication information of a user to the SSO agent 220. For example, the authentication web server 240 may transmit the request for authentication information of a user to the local host web server 222 of the SSO agent 220.

In operation 435 of the method 500, the SSO agent 220 may verify a browser. For example, the SSO agent 220 may verify whether the browser is a set browser. In some implementations, to prevent account information from being extorted when a user Hypertext Transfer Protocol (HTTP) request is forged or manipulated by a browser, verification may be performed on the browser to verify whether the browser is qualified to request login information.

In operation 440 of the method 500, the SSO agent 220 may verify the authentication web server 240. For example, the SSO agent 220 may verify the authentication web server 240 using referrer information on a subject requesting account information to block an account information request from a fake site. In some implementations, the SSO agent 220 may terminate when a received request is not from an authentication web server, for example, when the received request is not from the authentication web server 240. In some implementations, the SSO agent 220 may verify a browser and verify whether the request is from the authentication web server, and execute the local host web server.

In some implementations, the authentication web server 240 may request a random number value from the SSO agent 220. For example, the authentication web server 240 may request a random number value from the local host web server 222 of the SSO agent 220. In some implementations, the authentication web server 240 may transmit a request for the random number value with the request for authentication information of a user transmitted to the SSO agent 220 in operation 430.

In operation 445 of the method 500, the SSO agent 220 may generate a random number value and transmit the generated random number value to the authentication web server 240. In some implementations, the SSO agent 220 may transmit the generated random number value only to the authentication web server 240. The SSO agent 220 may transmit the random number value only to the authentication web server 240 to prevent a random website from requesting a random number value from the local host web server 222 and receiving the returned random number value from the local host web server 222.

In some implementations, a data transmission among the local host web server 222 of the SSO agent 220, the service web server 230, and the authentication web server 240 may be a message exchange via a local host. For example, a message exchange by HTTP protocol may correspond to a message exchange occurring in a local host rather than on an external network. For example, operations 410, 415, 420, 425, 430, 435, 440, and 445 may be message exchanges occurring in the local host. Exchanging a message in the local host and using the generated random number may prevent data from being extorted by the external network. The local host may be the electronic device or the local host web server.

In operation 450 of the method 500, the authentication web server 240 may generate an eigenvalue by encrypting the random number value (received in operation 445) with a private key (e.g., the private key 242). In some implementations, the authentication web server 240 may encrypt a random number value and a timestamp (e.g., a time when a random number value is received) together. For example, the authentication web server 240 may cryptographically sign by adding the random number value and the timestamp using a byte array. In some implementations, the eigenvalue generated by the authentication web server 240 may be received by the local host web server 222 of the electronic device.

In operation 455 of the method 500, the authentication web server 240 may transmit a request to verify the eigenvalue to the SSO agent 220. In some implementations, the authentication web server 240 may transmit the eigenvalue to the local host web server 222.

In operation 460 of the method 500, the local host web server 222 in the SSO agent 220 may transmit a request to authenticate the eigenvalue to the authentication API server 250. In some implementations, in operation 460, the electronic device may call the authentication API server 250 by transmitting a user authentication token, for example, authentication information, stored in the electronic device along with the eigenvalue to the authentication API server 250. For example, the user authentication token may be a token that the SSO agent 220 receives in response to a user account being logged in to. In some implementations, in response to calling the authentication API server 250, the local host web server 222 may transmit an encrypted eigenvalue received from the authentication web server 240.

In operation 465 of the method 500, the authentication API server 250 may authenticate the eigenvalue. In some implementations, the authentication API server 250 may store a public key (e.g., the public key 252) generated by the authentication web server 240. The authentication API server 250 may store the stored public key corresponding to the authentication web server 240. For example, in response to an identifier of the authentication web server 240 being "A", an identifier of the public key generated by the authentication web server "A" may correspond to "A", and the public key may be stored.

For example, in response to the eigenvalue received from the SSO agent 220 being encrypted by the authentication web server "A", the authentication API server 250 may decrypt the eigenvalue using the public key "A". In response to the authentication API server 250 decrypting the eigenvalue using the public key "A", it may be verified that the received eigenvalue is from the electronic device. The eigenvalue being decrypted by the public key "A" is a guarantee that the eigenvalue was encrypted on the authentication web server "A". In response to the received eigenvalue being decrypted by the public key received from the authentication web server 240, the authentication API server 250 may determine that a request received from the local host web server 222 is from the authentication web server 240.

In some implementations, in operation 465, the authentication API server 250 may verify whether the user authentication token received from the SSO agent 220 is a user authentication token of a user logged in to a service. For example, it may be possible to verify whether the token is a user authentication token issued when the SSO agent 220 logged in with user account information.

In operation 470 of the method 500, the authentication API server 250 may separate the random number and the timestamp from the byte array of the decrypted eigenvalue. The authentication API server 250 may determine whether the separated timestamp is within a valid time range, for example, within a set time (e.g., within a set time range from a time when a request is received from the local host web server 222).

In operation 475 of the method 500, the authentication API server 250 may determine whether the random number value separated from the byte array is valid. For example, the authentication API server 250 may store the random number value separated from the byte array during a period set in the electronic device such as a cache memory. The authentication API server 250 may determine whether the random number value decrypted from the received eigenvalue is a duplicate value using the random number value stored in the electronic device. If the random number value decrypted from the received eigenvalue matches the random number value stored in the electronic device, the request received from the SSO agent 220 may be a duplicate request.

In operation 480 of the method 500, the authentication API server 250 may transmit the eigenvalue and/or a result of authenticating the user authentication token to the SSO agent 220. For example, the authentication API server 250 may inform the local host web server 222 whether the request received from the local host web server 222 is validated based on a result of authenticating or validating the user authentication token and/or the eigenvalue. In response to the request received from the local host web server 222 not being validated (e.g., in response to a user authentication token being not valid, in response to an eigenvalue being not decrypted with a public key, in response to a timestamp exceeding a set time, and in response to a random number being identical to a random number stored in the electronic device), the authentication API server 250 may inform the local host web server 222 that the corresponding request is a malicious request transmitted by a random proxy web server.

In operation 485 of the method 500, in response to the eigenvalue being authenticated as valid by the authentication API server 250, the SSO agent 220 may transmit the authentication information to the authentication web server 240. In some implementations, in operation 485, in response to the request being verified as a normal request by the authentication API server 250, the local host web server 222 may transmit the user authentication information to the authentication web server 240.

The authentication web server 240 may allow login to a service web server with an account of a user to be performed using authentication information of the user.

In operation 490 of the method 500, the SSO agent 220 may send a notification informing the user 300 that login is complete. In some implementations, in operation 485, in response to the SSO agent 220 transmitting the authentication information to the authentication web server 240, the SSO agent 220 may display a message on a display module of the electronic device that login to the service web page 211 or the authentication web page 212 is completed. In some implementations, the service web page 211 and/or the authentication web page 212 may be executed on the browser in response to a message received from the service web server 230 and/or the authentication web server 240.

A login completion notification message may be displayed on the display module of the electronic device as described above, or may be output as voice or sound through a sound output module (e.g., the sound output module 155) of the electronic device.

For example, a notification message that login on a browser by which authentication information is received is complete may be provided. For example, the browser may display a message that the login is complete on the display module of the electronic device.

In operation 495 of the method 500, in response to the authentication information being transmitted to the authentication web server 240, the local host web server 222 may terminate, and in operation 496 of the method 500, the SSO agent 220 may terminate. Since the local host web server 222 and the SSO agent 220 transmit the authentication information of the user to the authentication web server 240 and then terminate, by this process it may be possible to prevent access by an external network.

According to various example embodiments, a method of providing login information may include sending, from a service web page 211 executed on a browser 210, a login request to an authentication web page 212 executed on the browser 210, executing, by the authentication web page 212, an SSO agent 220 in an electronic device 101, sending, by the authentication web page 212, a request for authentication information of a user to the SSO agent 220, generating, by the SSO agent 220, a random number and transmitting the random number to the authentication web page 212, generating an encrypted eigenvalue on an authentication web server 240 based on the random number and transmitting the eigenvalue to the SSO agent 220, calling, by the SSO agent 220, an authentication API server 250 to transmit the eigenvalue, validating the eigenvalue on the authentication API server 250; and receiving, by the SSO agent 220, a result of the validating from the authentication API server 250, and transmitting the authentication information 221 to the authentication web server 240.

The executing of the SSO agent 220 may include receiving, by the SSO agent 220, a random port number from the authentication web page 212, and executing a local host web server 222 to communicate with the authentication web server 240 and the authentication API server 250 in the SSO agent 220 based on the port number.

The transmitting of the random number to the authentication web page 212 may include verifying whether the browser 210 is a set browser 210, verifying the authentication web page 212 from which the request for the authentication information 221 is sent, and transmitting the random number to the authentication web page 212.

The transmitting of the eigenvalue to the SSO agent 220 may include generating, by the authentication web server 240, the eigenvalue by encrypting the random number and a timestamp using a private key 242.

The validating of the eigenvalue may include decrypting the eigenvalue using a public key 252 corresponding to the private key 242 and stored in the authentication API server 250.

The validating of the eigenvalue may include verifying whether the random number of the decrypted eigenvalue is used, and verifying whether the timestamp falls within a set time.

The transmitting of the authentication information to the authentication web server 240 may include transmitting the authentication information to the authentication web server 240 and then terminating the SSO agent 220.

According to various example embodiments, a method of providing login information may include sending, from a service web page 211 executed on a browser 210, a login request to an authentication web page 212 executed on the browser 210, executing, by the authentication web page 212, an SSO agent 220 in an electronic device 101, sending, by the authentication web page 212, a request for authentication information 221 of a user to the SSO agent 220, generating, by the SSO agent 220, a random number, and transmitting the random number to the authentication web page 212, generating an eigenvalue by encrypting the random number and a timestamp on an authentication web server 240 using a private key, and transmitting the eigenvalue to the SSO agent 220, calling, by the SSO agent 220, an authentication API server 250 using a user authentication token stored in the electronic device 101 to transmit the eigenvalue, validating the user authentication token on the authentication API server 250, and decrypting the eigenvalue using a public key 252 corresponding to the private key 242 to validate the eigenvalue, and receiving, by the SSO agent 220, a result of the validating from the authentication API server 250, and transmitting the authentication information 221 to the authentication web server 240.

The executing of the SSO agent 220, the sending of the request for the authentication information 221, and the transmitting of the random number to the authentication web page 212 may include using a message exchanged in the electronic device 101.

The transmitting of the random number to the authentication web page 212 may include verifying whether the browser 210 is a set browser 210, verifying the authentication web page 212 from which the request for the authentication information 221 is sent, and transmitting the random number to the authentication web page 212.

According to various example embodiments, an electronic device 101 may include at least one processor 120, and a memory 130 configured to store instructions executed by the processor 120, a browser 210, and an SSO agent, wherein, the browser 210 is configured to access a service web server 230 and an authentication web server 240 to execute a service web page 211 and an authentication web page 212, the SSO agent 220 is configured to log in to the electronic device 101 and/or the service web server 230, and the at least one processor 120 is configured to, in response to the instructions being executed by the processor 120, send, from the service web page 211 executed on the browser 210, a login request to the authentication web page 212 executed on the browser 210, cause the authentication web page 212 to execute the SSO agent 220, and to send a request for authentication information 221 of a user to the SSO agent 220, and cause the SSO agent 220 to generate a random number and transmit the random number to the authentication web page 212, to call an authentication API server 250 to transmit the eigenvalue, and to receive a validation result of the eigenvalue from the authentication API server 250 and transmit the authentication information 221 to the authentication web server 240.

The at least one processor 120 may be configured to cause the SSO agent 220 to, in response to the instructions being executed by the processor 120, receive a random port number from the authentication web page 212, and execute a local host web server 222 to communicate with the authentication web server 240 and the authentication API server 250 in the SSO agent 220 based on the port number.

The at least one processor 120 may be configured to cause the SSO agent 220 to, in response to the instructions being executed by the processor 120, verify whether the browser 210 is a set browser 210, verify the authentication web page 212 from which the request for the authentication information 221 is sent, and transmit the random number to the authentication web page 212.

The eigenvalue may be obtained, by the authentication web server 240, by encrypting the random number and a timestamp using a private key 242.

The authentication API server 250 may be configured to decrypt the eigenvalue using a public key 252 corresponding to the private key 242 and stored in the authentication API server 250 to validate the eigenvalue.

The at least one processor 120 may be configured to, in response to the instructions being executed by the processor 120, transmit the authentication information 221 to the authentication web server 240 and then terminate the SSO agent 220. The electronic device 101 may perform one or more processes or functions described herein. The electronic device 101 may perform operations based on the processor 120 executing software instructions stored by a non-transitory computer-readable medium, such as the memory 130. A computer-readable medium is defined herein as a non-transitory memory device. A memory device includes memory space within a single physical storage device or memory space spread across multiple physical storage devices.

Software instructions may be read into the memory 130 from another computer-readable medium or from another device via the communication module 190. When executed, software instructions stored in the memory 130 may cause the processor 120 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIGS. 1 and 4 are provided as an example. In practice, the electronic device 101 may include additional components, fewer components, different components, or differently arranged components than those shown in FIGS. 1 and 4. Additionally, or alternatively, a set of components (e.g., one or more components) of the device 101 may perform one or more functions described as being performed by another set of components of the device 101.

In embodiments, any one of the operations or processes of FIG. 2, 3 or 5 may be implemented by or using any one of the elements illustrated in FIGS. 1 and 4.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A method of providing login information, the method comprising:
    sending, from a service web page executed on a browser, a login request to an authentication web page executed on the browser;
    executing, by the authentication web page, a single sign on (SSO) agent in an electronic device;
    sending, by the authentication web page, a request for authentication information of a user to the SSO agent;
    generating, by the SSO agent, a random number and transmitting the random number to the authentication web page;
    generating an encrypted eigenvalue on an authentication web server based on the random number and transmitting the encrypted eigenvalue to the SSO agent;
    calling, by the SSO agent, an authentication application programming interface (API) server, and transmitting the encrypted eigenvalue;
    validating the encrypted eigenvalue on the authentication API server; and
    receiving, by the SSO agent, a result of the validating from the authentication API server, and transmitting the authentication information to the authentication web server.

2. The method of claim 1, wherein the executing of the SSO agent comprises:
    receiving, by the SSO agent, a random port from the authentication web page; and
    executing a local host web server to communicate with the authentication web server and the authentication API server in the SSO agent based on the random port.

3. The method of claim 1, wherein the transmitting of the random number to the authentication web page comprises:
    verifying whether the browser is a set browser;
    verifying the authentication web page from which the request for the authentication information is sent; and
    transmitting the random number to the authentication web page.

4. The method of claim 1, wherein the transmitting of the encrypted eigenvalue to the SSO agent comprises:
    generating, by the authentication web server, the encrypted eigenvalue by encrypting the random number and a timestamp using a private key.

5. The method of claim 4, wherein the validating of the encrypted eigenvalue on the authentication API server comprises:
    decrypting, by the authentication API server, the encrypted eigenvalue using a public key corresponding to the private key, wherein the public key is stored in the authentication API server.

6. The method of claim 5, wherein the validating of the encrypted eigenvalue on the authentication API server further comprises:
    verifying whether the decrypted eigenvalue includes the random number; and
    verifying whether the timestamp is within a set time.

7. The method of claim 1, wherein the transmitting of the authentication information to the authentication web server comprises:
    transmitting the authentication information to the authentication web server, and
    terminating the SSO agent.

8. A method of providing login information, the method comprising:
    sending, from a service web page executed on a browser, a login request to an authentication web page executed on the browser;
    executing, by the authentication web page, a single sign on (SSO) agent in an electronic device;
    sending, by the authentication web page, a request for authentication information of a user to the SSO agent;
    generating, by the SSO agent, a random number, and transmitting the random number to the authentication web page;
    generating an encrypted eigenvalue by encrypting the random number and a timestamp on an authentication web server using a private key, and transmitting the encrypted eigenvalue to the SSO agent;
    calling, by the SSO agent, an authentication application programming interface (API) server using a user authentication token stored in the electronic device to transmit the encrypted eigenvalue;
    validating the user authentication token on the authentication API server, and decrypting the encrypted eigenvalue using a public key corresponding to the private key to validate the encrypted eigenvalue; and
    receiving, by the SSO agent, a result of the validating from the authentication API server, and transmitting the authentication information to the authentication web server.

9. The method of claim 8, further comprising:
    exchanging one or more messages in the electronic device, wherein the executing of the SSO agent, the sending of the request for the authentication information, and the transmitting of the random number to the authentication web page are each based at least in part on the one or more messages exchanged in the electronic device.

10. The method of claim 8, wherein the transmitting of the random number to the authentication web page comprises:
verifying whether the browser is a set browser;
verifying the authentication web page from which the authentication information is sent; and
transmitting the random number to the authentication web page.

11. An electronic device comprising:
at least one processor; and
a memory configured to store instructions executed by the at least one processor, a browser, and a single sign on (SSO) agent
wherein the browser is configured to access a service web server and an authentication web server to execute a service web page and an authentication web page,
the SSO agent is configured to log in to the electronic device and/or the service web server, and
the at least one processor is configured to, in response to the instructions being executed by the at least one processor:
send, from the service web page executed on the browser, a login request to the authentication web page executed on the browser,
cause the authentication web page to execute the SSO agent, and to send a request for authentication information of a user to the SSO agent,
cause the SSO agent to generate a random number and transmit the random number to the authentication web page,
call an authentication application programming interface (API) server to transmit an encrypted eigenvalue received from an authentication web server, and to receive a validation result of the encrypted eigenvalue from the authentication API server, and transmit the authentication information to the authentication web server.

12. The electronic device of claim 11, wherein the at least one processor is further configured to:
cause the SSO agent to, in response to the instructions being executed by the at least one processor, receive a random port from the authentication web page, and execute a local host web server to communicate with the authentication web server and the authentication API server in the SSO agent based on the random port.

13. The electronic device of claim 11, wherein the at least one processor is further configured to:
cause the SSO agent to, in response to the instructions being executed by the at least one processor, verify whether the browser is a set browser, verify the authentication web page from which the request for the authentication information is sent, and transmit the random number to the authentication web page.

14. The electronic device of claim 11, wherein the authentication web server obtains the encrypted eigenvalue by encrypting the random number and a timestamp using a private key.

15. The electronic device of claim 14, wherein the authentication API server is configured to decrypt the encrypted eigenvalue using a public key corresponding to the private key, wherein the public key is stored in the authentication API server to validate the encrypted eigenvalue.

16. The electronic device of claim 11, wherein the at least one processor is further configured to:
transmit the authentication information to the authentication web server, and terminate the SSO agent.

17. A non-transitory computer readable medium for storing computer readable program code or instructions for carrying out operations, when executed by a processor, for providing login information, the operations comprising:
accessing a service web server and an authentication web server, by an electronic device via a browser stored on the electronic device, to execute a service web page from the service web server and an authentication web page from the authentication web server;
accessing the executed service web page, by the electronic device via the browser, to cause the service web server to send a login request to the authentication web server;
receiving one or more instructions from the authentication web server, by the electronic device, in response to causing the service web server to send the login request to the authentication web server, to execute a single sign on (SSO) agent of the electronic device;
receiving a request for authentication information from the authentication web server, by the electronic device via the SSO agent;
generating a random number, by the electronic device via the SSO agent, in response to receiving the request for authentication information;
sending the random number to the authentication web server, by the electronic device via the SSO agent;
receiving an eigenvalue generated on the authentication web server, by the electronic device via the SSO agent, wherein the eigenvalue is generated based at least in part on the random number;
sending a request to authenticate the eigenvalue, by the electronic device via the SSO agent, to an authentication application programming interface (API) server;
receiving an authentication result corresponding to the eigenvalue, by the electronic device via the SSO agent, from the authentication API server in response to sending the request to authenticate the eigenvalue; and
sending authentication information to the authentication web server, by the electronic device via the SSO agent, based at least in part on the authentication result, the authentication information corresponding to the login request sent by the service web server, and wherein the authentication information is used by the authentication web server to respond to the login request from the service web server.

18. The non-transitory computer readable medium of claim 17, wherein the operations further comprise:
executing a local host web server, by the electronic device via the SSO agent, in response to the authentication web server executing the SSO agent; and
verifying the browser and the authentication web page, by the electronic device via the SSO agent, in response to receiving the request for authentication information from the authentication web server.

19. The non-transitory computer readable medium of claim 17, wherein the operations further comprise:
outputting a notification, by the electronic device via the SSO agent, in response to sending the authentication information to the authentication web server, the notification indicating that a logging in of a user to a service provided by the service web server is complete.

20. The non-transitory computer readable medium of claim 17, wherein the operations further comprise:
terminating the local host web server, by the electronic device via the SSO agent; and terminating the SSO agent, by the electronic device via the SSO agent.

* * * * *